UNITED STATES PATENT OFFICE.

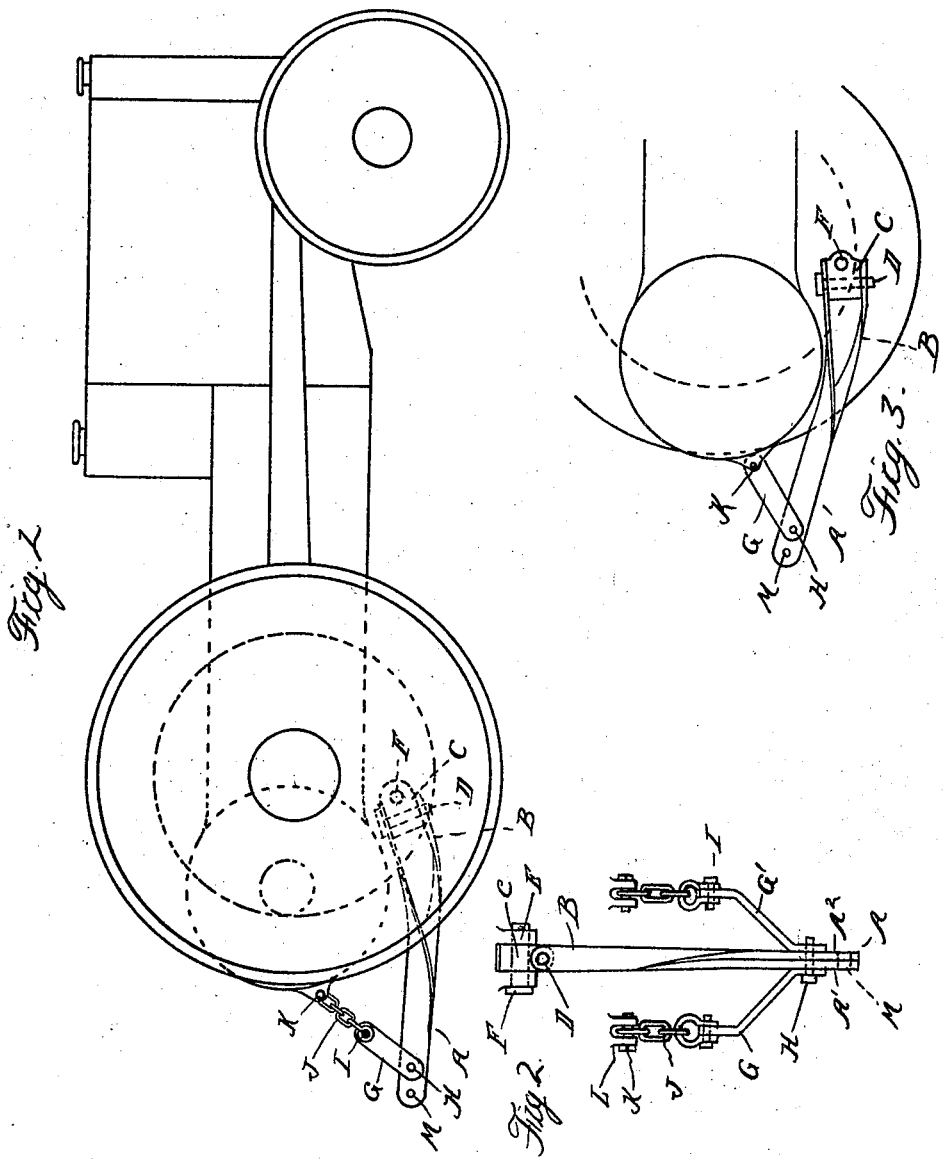

ERNEST GOLDBERGER, OF DETROIT, MICHIGAN.

DRAFT-RIGGING.

1,383,716.  Specification of Letters Patent.  Patented July 5, 1921.

Application filed January 30, 1920. Serial No. 355,204.

*To all whom it may concern:*

Be it known that I, ERNEST GOLDBERGER, a citizen of the United States of America, residing at Detroit, in the county of Wayne and State of Michigan, have invented certain new and useful Improvements in Draft-Rigging, of which the following is a specification, reference being had therein to the accompanying drawings.

The invention relates to draft rigging particularly designed for use in connection with tractors or other self-propelled vehicles, and it is the object of the invention to provide a construction which may be given a limited freedom for universal pivotal adjustment when used for drawing certain implements and which may be secured in fixed position for use where backing is required. To this end the invention consists in the construction as hereinafter set forth.

In the drawings:

Figure 1 is a side elevation of a tractor to which my improved draft rigging is applied, and showing the same as providing freedom for universal movement;

Fig. 2 is a plan view of the construction as shown in Fig. 1; and

Fig. 3 is a view similar to Fig. 1, showing the device adjusted for rigidity.

A is the draw-bar which, as specifically shown, is formed of two members A' and A² having their forward ends spread apart and twisted to form a bifurcated bearing B. C is a bearing block embraced by the furcations and pivotally secured thereto by a pin D. E is a bifurcated bearing on some rigid part of the tractor, which embraces the block C and is pivotally secured thereto by a pin F. The pins F and D are in planes perpendicular to each other, so as to provide between the bearing E and the draft bar a universal pivotal joint.

G and G' are bars secured to the draft bar A near its rear end by means of the pin or bolt H. These arms are bent or spread apart laterally and at their free ends are apertured for attachment by pins I to chains, or other flexible connections J. The latter have their opposite ends secured by pins K to apertured bearings L upon a rigid portion of the tractor frame. The arrangement is such that the universal pivotal connection between the forward end of the draft bar and the tractor frame will provide freedom for either vertical or lateral movement of the rear end thereof, while the arms G and G' and flexible connections J serve to limit this movement.

When the tractor is used for drawing a trailer, it is sometimes necessary to back and where the draft bar is pivoted, this operation is difficult. I have, therefore, provided for converting the universal pivoted draft bar into a rigid structure, which is accomplished by removing the chains or flexible connections J and attaching the arms G and G' directly by the pins K to the bearings L. When thus adjusted, there is formed in effect a triangular rigid frame, which holds the rear end of the draft bar from either vertical or lateral movement.

My improved draft rigging may be used for various purposes, but it is particularly useful for the alternative attachment of agricultural implements, such as plows, which require a free flexibility for pivotal action and trailers, the draft bars of which may be rigidly attached to the tractor. Any suitable connection may be provided for attachment of the draft bar to the device drawn, but as shown, the rear end is apertured, as indicated at M, for engagement with a clevis or other attachment means.

What I claim as my invention is:

1. The combination with a draft vehicle provided with three draft attachment bearings in rigid relation to each other, of a draft bar, a universal pivotal connection between the forward end of said draft bar and one of said bearings, brace bars attached to the rear of said draft bar and engageable respectively with the other two bearings to form a rigid connection therewith, and flexible extensions for said brace bars attachable to said bearings, permitting limited freedom for universal movement.

2. The combination with a draft vehicle, of a draft rigging comprising a main draft bar universally pivotally connected at its forward end to said draft vehicle, a pair of brace arms attached to the rear portion of said draft bar and extending laterally on opposite sides thereof, means for rigidly attaching the ends of said brace bars to said draft vehicle, and flexible extensions for said brace bars insertible between the same and the points of attachment to said vehicle for providing limited universal freedom of movement.

3. The combination of a draft vehicle and three attachment bearings rigidly secured thereto and not in a straight line, of a rigid draft bar pivotally secured at one end to an intermediate attachment bearing, a pair of oppositely extending brace rods secured to the rear portion of the draft bar, means for securing the forward end portions of the brace rods directly to the other attachment bearings, and flexible means for attaching said brace bars to said bearings, permitting limited freedom for universal movement.

In testimony whereof I affix my signature.

ERNEST GOLDBERGER.